United States Patent

[11] 3,585,953

[72] Inventor Max Otto Kramer
15317 De Pauw, Pacific Palisades, Calif. 90272
[21] Appl. No. 835,319
[22] Filed June 20, 1969
[45] Patented June 22, 1971

[54] MEANS AND METHOD FOR STABILIZING LAMINAR BOUNDARY LAYER FLOW
5 Claims, 1 Drawing Fig.

[52] U.S. Cl. .................................................. 114/67
[51] Int. Cl. .................................................. B63b 1/34
[50] Field of Search ....................................... 114/67

[56] References Cited
UNITED STATES PATENTS
3,076,725 2/1963 Boggs ........................... 114/67 X
3,154,043 10/1964 Momsen ....................... 114/67 X
3,161,385 12/1964 Kramer ......................... 114/67 X

*Primary Examiner*—Andrew H. Farrell

ABSTRACT: The invention is directed toward dynamically responsive surface means for maintaining laminar boundary layer flow so as to reduce the frictional drag normally caused by turbulence in the fluid adjacent to a solid surface. By following the teachings of this invention which in its various practices may be applied to both, liquid and gaseous flow, it is possible to maintain a laminar boundary layer and the concomitant low drag coefficient under conditions where a turbulent boundary layer and the corresponding high drag coefficient would otherwise prevail.

A representative of the prior art in this field is the U.S. Pat. No. 3,161,385 which was granted to the same inventor on Dec. 15, 1964. The present invention has resulted from an uninterrupted research effort of the inventor aimed at the reduction to practice of the objectives expressed in the U.S. Pat. No. 3,161,385.

3,585,953
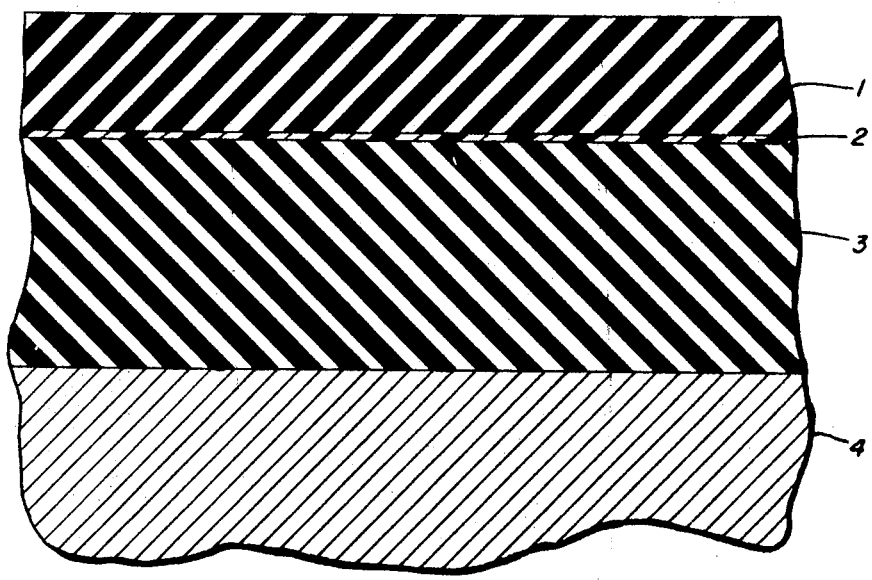
INVENTOR.
MAX O. KRAMER

MEANS AND METHOD FOR STABILIZING LAMINAR BOUNDARY LAYER FLOW

This invention relates to means for reducing the frictional drag between a solid body and an adjacent fluid under conditions of relative motion. More specifically, it is directed toward dynamically responsive surface means for maintaining laminar boundary layer flow so as to reduce the frictional drag normally caused by turbulence in the fluid adjacent to a solid surface. By following the teachings of this invention which in its various practices may be applied to both, liquid and gaseous flow, it is possible to maintain a laminar boundary layer and the concomitant low drag coefficient under conditions where a turbulent boundary layer and the corresponding high drag coefficient would otherwise prevail. The invention represents a continuation of the U.S. Pat. No. 3,161,385 that was granted the same inventor on Dec. 15, 1964. The present invention has resulted from an uninterrupted research effort of the inventor aimed at the reduction to practice of the objectives expressed in the patent 3,161,385. As previously, the present invention is based on the discovery that the flow characteristics in a relatively moving fluid adjacent to a solid surface may be controlled by making the surface resiliently pressure-responsive and by providing means cooperative therewith to weaken or suppress pressure fluctuations in the boundary layer. Such a resiliently pressure-responsive surface serves the purpose of the invention by preventing or retarding the growth of dynamically unstable disturbances in the boundary layer which on a rigid surface would lead to fully developed turbulence. The FIGURE shows the cross section of surface coating that was found to be more effective in drag reduction and at the same time is easier to manufacture and to mount on bodies than those coatings described in the patent 3,161,385. In the FIGURE, the coating consists of three layers 1,2,3 which are bonded to each other and finally as a sheet bonded to the rigid surface 4 of the body the drag of which is to be reduced. All subsequent detail information about this coating applies to water as the ambient medium, an average speed of the body of 40 knots, and a length of the body of approximately six feet. It will be clear to experts in the field how this information has to be converted to apply to different speeds, different media, and different lengths of the bodies. The top layer 1 is the FIGURE which is in contact with the water should consist of a soft elastomer with great resiliency or little inherent damping. The modulus of elasticity of the elastomer should be near 100 p.s.i. when measured at small elongations. The thickness of layer 1 should be approximately one-third of the total thickness of the local laminar boundary layer. Since, in a given medium and at a given speed, the laminar boundary layer thickness increases with the square root of the distance from the nose of the body, the thickness of the top layer 1 should increase correspondingly. It has been found that a stepwise increase of the thickness of the coating in two or three steps is normally sufficient to obtain almost the maximum possible drag reduction. A typical material for the top layer 1 is the following rubber composition which rubber experts will recognize as a soft rubber with great resiliency or low inherent damping.

| Composition | Parts by weight | Remarks |
| --- | --- | --- |
| Polyisoprene | 100 | Cured at 300° F. for 20 minutes. |
| Zinc oxide | 5 | |
| Stearic acid | 1 | |
| Methyl zimate | 0.25 | |
| Sulfur | 2 | |
| Algerite white | 1 | |
| Carbon black | 2 | |
| Dibutyl phthalate | 60 | |
| Altex | 1 | |

The center layer 2 should consist of a thin film of a material with a great modulus of elasticity. Good results were obtained when using polyester film (mylar) of one-fourth mil thickness. The purpose of this layer is to stiffen the coating in flow direction while little decreasing its pressure-sensitivity. normal to the coating surface. This is necessary because the elasticity of the coating in flow direction has a destabilizing effect on the laminar boundary layer. The bottom layer 3 of the coating which is in contact with the rigid surface of the body, should consist of a soft elastomer with low resiliency or large inherent damping. Its modulus of elasticity should be about equal to that of the top layer or also be 100 p.s.i. The thickness of the bottom layer 3 should be about two-thirds of the local laminar boundary thickness. A typical material for the bottom layer is the following rubber composition which rubber experts will recognize as a soft rubber with low resiliency or large inherent damping.

| Composition | Parts by weight | Remarks |
| --- | --- | --- |
| Neoprene W | 100 | Cured at 310° F. for 18 minutes. |
| Zinc oxide | 5 | |
| Maglite M | 4 | |
| Stearic acid | 2 | |
| Ma-22 | 0.75 | |
| Neozone A | 1.5 | |
| Neophaxa A | 80 | |
| Circo light oil | 80 | |

I claim:

1. I claim means for reducing the resistance to relative movement between a solid body and a continuous fluid created by boundary flow under conditions where a turbulent boundary tends to occur on a rigid surface, comprising a composite surface structure including:
    a top layer in contact with the fluid consisting of a soft elastomer with high resiliency and a thickness of approximately one-third of the local laminar boundary layer thickness
    a center layer of a material with a high modulus of elasticity and minute thickness
    a bottom layer in contact with the rigid body surface consisting of a soft elastomer with low resiliency and a thickness of approximately two-thirds of the local laminar boundary layer thickness.

2. I claim means for reducing the resistance to relative movement between a solid body and a continuous fluid created by boundary flow under conditions where a turbulent boundary tends to occur on a rigid surface, comprising the composite surface structure as set forth in claim 1, in which all three layers are mounted on the body with a minimum of stretch or compression.

3. I claim means for reducing the resistance to relative movement between a solid body and a continuous fluid created by boundary flow under conditions where a turbulent boundary tends to occur on a rigid surface, comprising the composite surface structure as set forth in claim 1, in which the center layer is slotted in flow direction or consists of appropriately spaced strips of a film with a high modulus of elasticity in order to facilitate the accurate mounting of the coating sections in their proper place on the body.

4. I claim means for reducing the resistance to relative movement between a solid body and a continuous fluid created by boundary flow under conditions where a turbulent boundary tends to occur on a rigid surface, comprising the composite surface structure as set forth in claim 1, in which the three layers are first bonded to each other forming then three-layer patches which are cut to their exact shape and are finally bonded to the body with a slow-hardening bonding agent that provides time to use adhesive tape to hold the butt joints of adjacent coating patches tightly together until the bonding agent has hardened, the tape can be removed, and a practically invisible seam is obtained.

5. I claim means for reducing the resistance to relative movement between a solid body and a continuous fluid created by boundary flow under conditions where a turbulent boundary tends to occur on a rigid surface, comprising the composite surface structure as set forth in claim 1, this surface structure covering the entire surface of the body from its nose to its tail end, as well as the control surfaces and the propellers.